C. W. SALADEE.

Curry Comb.

No. 1,854. Reissued Jan. 24, 1865.

WITNESSES

G W Noble.

E A Saladee.

INVENTOR

Cyrus W. Saladee.

N. PETERS. Photo-Lithographer. Washington, D. C.

UNITED STATES PATENT OFFICE.

CYRUS W. SALADEE, OF PUTNAM, OHIO.

IMPROVEMENT IN CURRY-COMBS.

Specification forming part of Letters Patent No. 45,640, dated December 27, 1864; Reissue No. 1,854, dated January 24, 1865.

*To all whom it may concern:*

Be it known that I, CYRUS W. SALADEE, of Putnam, Muskingum county, State of Ohio, have invented a new and Improved Mode of Constructing Curry-Combs; and I do hereby declare that the following is a full and exact description thereof, reference being had to the accompanying drawings, and to the letters of reference marked thereon.

The nature of my invention consists, first, in constructing a double-faced curry-comb, the teeth of which are secured to both sides of a single metallic frame or plate, the same being attached to the hand-holds or handles in such manner as to admit readily of the use of either side of the comb; and, secondly, in attaching to the comb two metallic handles on a parallel line with the teeth of the same in such a manner as to admit of grasping the comb over the top, and thereby dispense with the use of the ordinary wood handle extending out on one side of the comb.

By this arrangement of two metallic handles, connected to the comb on a line with the teeth, and extending up over the top side of the comb, a better, more secure, and comfortable hold upon the comb is obtained than has heretofore been done.

Another advantage I claim for this novel arrangement of hand-holds is, that a much greater number of combs can be done up and packed in a given space by the manufacturer, for shipment, &c.—than can be done where a single handle is attached after the old manner.

Another advantage I claim for this arrangement of hand-holds is, that, being so compact, it can be handily carried by any one traveling on horseback—such as are in the cavalry service, &c.—which is not the case with the ordinary comb, because of the awkward position of the handle; and, finally, it can be manufactured cheaper on the plan hereinafter described than upon the old style.

To enable others skilled in the art to make and use my invention, I will proceed to describe its construction and operation.

Figure 1:
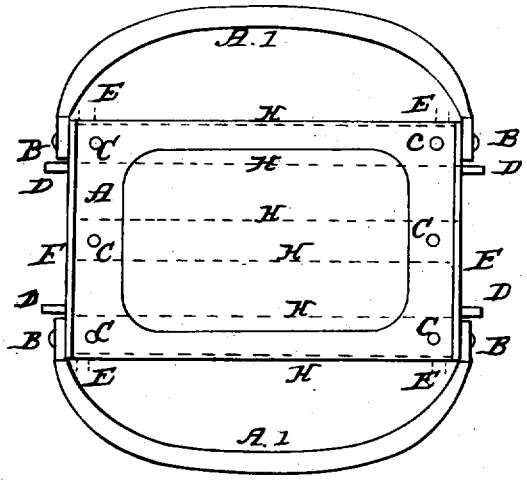
Figure 2:
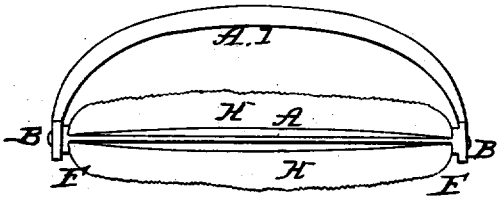
Figure 1:
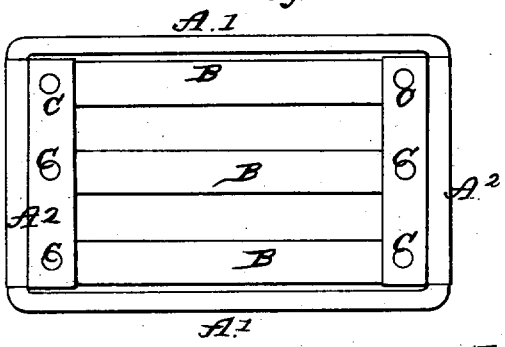
Figure 2:
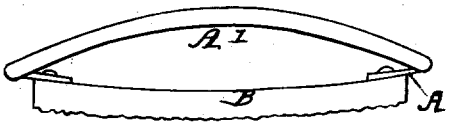

I construct a double-faced curry-comb by first providing a frame or plate, A, Figs. 1 and 2, Plate No. 1, across each end of which is attached the thin strip F, for the purpose of strengthening the frame A, and to give a finished appearance to the ends of the comb. On the outside of this strip F, I secure the handle-rivets B B B B and studs D D D D, all of the several parts thus far described to be cast or stamped solid, each with the other. The teeth H, I fasten to the frame or plate A by the rivets *c c c c c c*, as shown in Fig. 1. These rivets pass through the plate A and project through the requisite distance on each side to secure the teeth on both sides of the frame or plate. These rivets, or their equivalents, are also cast solid with the frame or plate A. To the rivets B B B B, I attach the handles A′, each end of which is provided with a corresponding hole to fit those rivets in such manner as to allow the handles A′ to work freely thereon. In Fig. 1, Plate 1, those handles are shown turned down on a line with the center of the comb; but in Fig. 2 the handles are turned up in the position ready for use.

Figure 3:
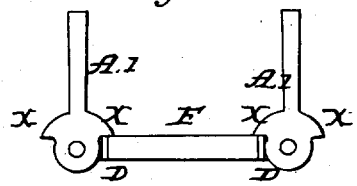

Fig. 3 is an end view of the comb with the handles A′ attached, showing the projections *x x x x* on the lower ends of the handles and the studs D D. Thus it will be seen that when those handles A′ are turned up to the desired point the projections *x x x x* come in contact with the studs D D, and by which they are prevented from turning down on the teeth of the comb, and thus the handles will stand in the same position, whether turned on one side of the comb or the other. The point for those handles to work on may be made substantially similar to those shown at B B B B, Fig. 1, on the sides of the comb at E E E E; but I now think the joints on the ends of the comb, as shown, the best position for them. To one side of the frame A may be attached a set of coarse teeth, and to the other a set of fine ones, or one side may have attached to it an ordinary comb, and the other may be provided with a card, just as the fancy may suggest.

The operation of this comb is as follows, viz: Turn the handles A′ A′ up over the opposite side of the one you intend using upon the horse, grasping one of the handles with the thumb of the right hand and the other with the four fingers, and by a slight pressure of the thumb and fingers the handles are made to rest firmly against the studs D D, when a permanent and comfortable hold of the comb is obtained.

Grasping the curry-comb immediately over the top by means of the handles described, or their equivalent, gives the hand an advantage in the u e of a comb thus held which cannot be attained in grasping it by a single handle off on one side of the comb. The tendency which all good grooms have to be constantly grasping the opposite side of the comb from the ordinary handle with the ends of their fingers is another proof of this fact.

Many, indeed, in purchasing a new comb of the ordinary kind divest it of the handle before using it, and then grasp the top of the comb by letting the thumb rest against one side and with the ends of the fingers grasp the opposite, showing that even this rude mode of applying the hand to the top of the comb is preferable to the old-fashioned handle. The use of the two metallic handles A′ A′ is not confined in their application to the double-faced curry-combs hereinbefore described, as I can as readily attach them to any form of single-faced comb.

Figs. 1 and 2, Plate 2, represent one of the ways of attaching handles A′ A′ to the ordinary single faced curry-combs. In this case the handles may be formed of very heavy wire, and secured at each end of the comb on a line with the teeth of the same, as already described; but the cheapest and most simple manner of securing those handles in the position described is to cut or stamp them solid with the ends of the frame of the comb. Thus $A^2$ $A^2$, Fig. 1, Plate 2, are the end pieces, to which the tooth-bars B B B B are secured by rivets *c c c c c c*. To these end pieces let the handles A′ A′ be stamped or cast solid and turned up the required distance to admit of room for the thumb and fingers between the handles and the top of the comb, as shown in Fig. 2.

By the use of the handles A′ A′ or their equivalent I am permitted to make a greater variety of curry-combs than can be produced in the old way. I am now making a style of single-faced comb (with handles as shown by Figs. 1 and 2, Plate 2) with a joint in the center of the frame of the comb, so as to admit of folding it up with the points of the teeth together, and by which arrangement the comb can be packed away in the smallest possible space and in a most convenient form for handy transportation by cavalrymen or travelers on horseback, and which desirable advantage cannot be attained without the application of handles A′ A′ secured to the comb on a parallel line with the teeth of the same, as already described.

Two metallic handles, substantially as hereinbefore described, may be attached to the top of the comb diagonally across the corners or across the ends at right angles with the teeth, and which slight variation of position might suit the fancy of some grooms as well if not better than when placed on a line parallel with the teeth.

Now, what I claim as new, of my invention, and desire to secure by Letters Patent, is—

1. The two metallic handles A′ A′, or their equivalent, secured to the sides or ends of the curry-comb, in the manner and for the purpose substantially as shown and described.

2. The frame or plate A, rivets B B B B, studs D D D D, Fig. 1, Plate 1, and projections *x x x x*, Fig. 3, in combination with the adjustable handles A′ A′, in the manner and for the purpose substantially as shown and described.

In testimony that I claim the above I hereunto set my hand.

CYRUS W. SALADEE.

In presence of—

G. W. NOBLE,

E. A. SALADEE.